United States Patent [19]

Komine

[11] 4,012,135
[45] Mar. 15, 1977

[54] MOTION PICTURE CAMERA

[75] Inventor: Yoshio Komine, Tokyo, Japan

[73] Assignee: Canon Kabushiki Kaisha, Tokyo, Japan

[22] Filed: Mar. 11, 1975

[21] Appl. No.: 557,304

[30] Foreign Application Priority Data

| Mar. 15, 1974 | Japan | 49-29815 |
| June 5, 1974 | Japan | 49-63788 |
| June 5, 1974 | Japan | 49-63789 |
| June 6, 1974 | Japan | 49-64383 |

[52] U.S. Cl. .................................. 352/72; 242/194
[51] Int. Cl.² ................................. G03B 23/02
[58] Field of Search ........... 352/72, 91 C; 242/194

[56] References Cited

UNITED STATES PATENTS

| 2,105,630 | 1/1938 | Becker | 352/72 |
| 2,119,375 | 5/1938 | Wurm | 352/72 |
| 2,226,363 | 12/1940 | Williams | 352/72 |
| 3,495,901 | 2/1970 | Neudecker | 352/72 |
| 3,514,197 | 5/1970 | Sho | 352/72 |
| 3,860,195 | 1/1975 | Holzhauser | 352/72 |
| 3,880,504 | 4/1975 | Marvin | 352/72 |

Primary Examiner—Monroe H. Hayes
Attorney, Agent, or Firm—Toren, McGeady and Stanger

[57] ABSTRACT

The present invention relates to a motion picture camera using a film cartridge in whose film winding up shaft a reverse preventing mechanism for preventing the reversed rotation of the winding up shaft is provided whereby the reversion preventing mechanism is released by pushing the central part of the winding up shaft along the axial direction, being characterized in that on the part on which the film cartridge is loaded a movable releasing mechanism for releasing the film reversion preventing mechanism is provided in such a manner that at the time of loading a film cartridge in the motion picture camera the releasing mechanism is recessed from the part on which the film cartridge is to be loaded to a position at which the loading of the film cartridge is possible by means of a control mechanism, while after having loaded the film cartridge the film reversion preventing mechanism is returned to a position at which the film reversion preventing mechanism operates.

23 Claims, 17 Drawing Figures

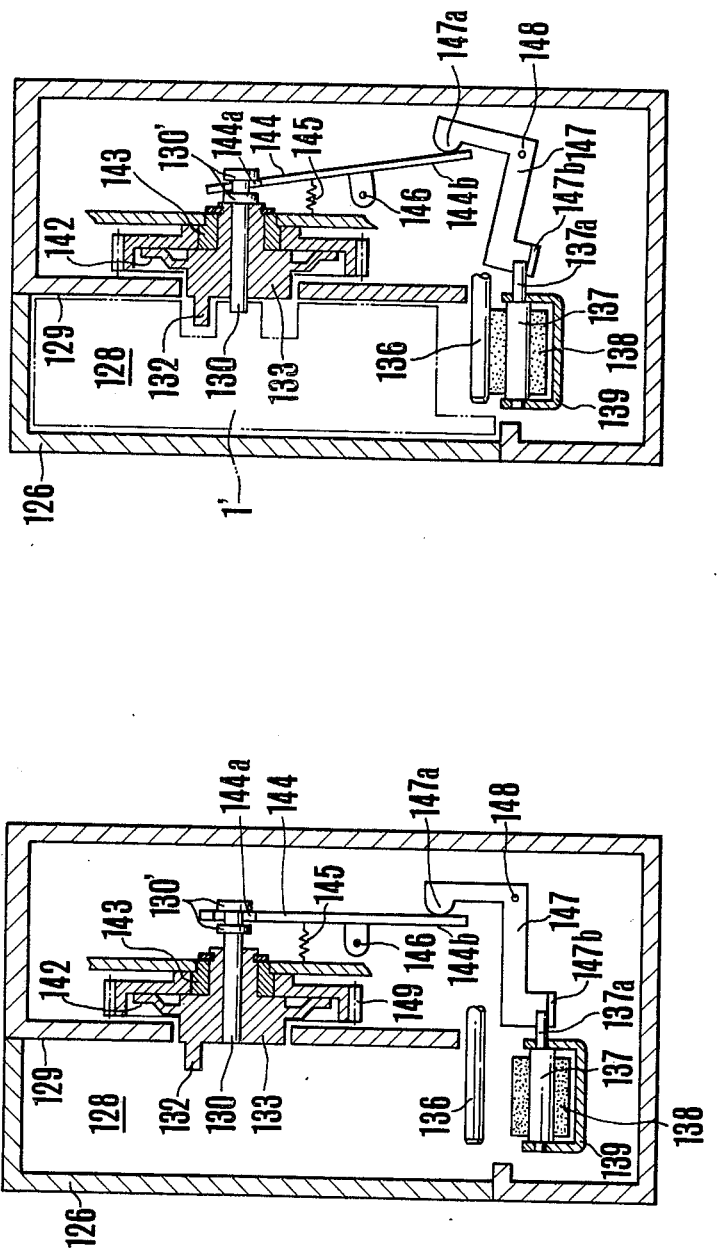

MOTION PICTURE CAMERA

BACKGROUND OF THE INVENTION

1. Field of the Invention

The present invention relates to a motion picture camera.

2. Description of the Prior Art

In the field of the conventional small size motion picture camera in which a film cartridge is generally used, in the film cartridge known under the name of super-eight, a reversion preventing mechanism allowing only for the forward shaft of the winding up rotation is provided in order to prevent the film from becoming loose. Therefore, in the case of the motion picture camera using such film cartridges it is generally impossible to apply a photographic techniques in which the rewinding of film is necessary, whereby the noise and the vibration produced by the reversion prevention mechanism become problematic.

In case it is desired to apply a photographic techniques such as for example, overlapping photography in which the film rewinding is essential, the film winding up shaft is brought out of the operation for winding up the film for a while, the film being pushed into the film cartridge without being wound up around the film winding shaft so as to be stored loosely therein. The film stored loosely is then returned to the supply side also so as to be stored loosely in the film cartridge and then the film winding up shaft is brought into the film winding up operation, so as to take motion pictures. However, with such a techniques as mentioned above, the film is often curved or folded when the film is stored loosely in the film cartridge in such a manner that not only a bad influence is given to the film but also the film is often broken. However, quite recently, for example, in DOLS 2,322,331, a film cartridge in which the reversion preventing mechanism is releasable in such a manner that in case of necessity a desired quantity of the film already exposed and wound up on the winding up shaft can be rewound already brought on the market. Further, such film cartridges as present such a mechanism and are able to record not only pictures but also sound easily, have also been brought on the market.

In the case of the motion picture camera in which such a film cartridge is to be loaded, it is so designed that at the center of the film winding up claw part corresponding to the film winding up shaft of the film cartridge in the film cartridge containing chamber a projecting pin member is provided in such a manner that the reversion preventing mechanism is released by the central part of the film winding up shaft of the film cartridge by means of the pin member when the film cartridge is loaded in the motion picture camera. Here, for example, in case a synchronous sound recording photography is carried out by using a film cartridge for synchronous sound recording, the reversion prevetig mechanism is released when the film cartridge for synchronous sound recording is loaded in order to eliminate the noise and the vibration produced by the reversion preventing mechanism which is disadvantageous especially for synchronous sound recording photography. However, the release part for the reversion preventing mechanism provided in such a film cartridge is arranged in a very small hole at the central part of the film winding up shaft of the film cartridge so that unless the film cartridge is not loaded in the motion picture camera with high precision, the projecting pin does not engage in the hole of the release part correctly in such a manner that the reversion preventing mechanism is not released. Further, in case the film cartridge is not loaded with high precision, the film in the film cartridge is not brought into the correct synchronous sound recording state in the case of the synchronous sound recording photography.

On the other hand, in case of the motion picture camera in the which a conventional film cartridge incapable of releasing the reversion preventing mechanism is loaded, a motion picture camera construction of the so-called drop-in system is often adopted according to which system the film cartridge is loaded in the film cartridge containing chamber, being the film cartridge slid in from the back of the motion picture camera. The motion picture camera according to this system has many advantages such as the easy loading of the film cartridge, the prevention of misloading, the realization of the compact motion picture camera and so on. Especially, a misexposure is completely prevented in case the cover of the cartridge chamber is opened by mistake while the film cartridge is still loaded in the motion picture camera because the part of the film being out of the film magazine and to be exposed is situated at a position quite contrary to the cover of the film cartridge chamber. However, in the case of the motion picture camera in which a film cartridge of the above mentioned new type is loaded, a fixed projecting pin member for releasing the reversion preventing mechanism is provided in the film cartridge containing chamber in such a manner that it is impossible to load a film cartridge in the motion picture camera of the drop-in system according to which system the film cartridge is loaded in the motion picture camera along a direction perpendicular to the axial direction of the projecting pin member because the front end of the cartridge strikes at the pin member. Further, in the case of the motion picture camera so constructed, that due to the conventional winding up claw member, the projecting pin member is movable along the axial direction and provided with a spring, so as normally to project into the film cartridge containing chamber. The projecting pin member is pushed down by a tapered part arranged at the front end of the film cartridge at the time of loading. If the front end of the film cartridge has passed the projecting pin member, the projecting pin projects into the film cartridge containing chamber before the central part is situated at the correct position in the concave portion of the film cartridge winding up shaft in such a manner that the further loading of the film cartridge becomes impossible.

As explained above, in into case of the conventional construction of the motion picture camera, the loading of such a new film cartridge, as mentioned above, in the motion picture camera is often disturbed while it is difficult to realize a new film cartridge loading method presenting many advantages of the drop-in system. Therefore, the application has been limited only to the motion picture camera presenting an opening so designed that the film cartridge can be loaded in the motion picture camera along the same direction as the axial direction of the projecting pin member of the film winding up claw member.

SUMMARY OF THE INVENTION

The first object of the present invention is to offer a motion picture camera eliminating the above mentioned shortcomings.

The second object of the present invention is to offer a motion picture camera using a film cartridge in whose film winding up shaft a releasable reversion preventing mechanism for preventing the reverse rotation of the film winding up shaft is provided, whereby on the part on which the film cartridge is loaded a movable releasing mechanism for releasing the film reversion preventing mechanism is provided in such a manner that at the time of loading a film cartridge in the motion picture camera the releasing mechanism is recessed from the part on which the film cartridge is to be loaded to a position at which the loading of the film cartridge is possible by means of a control mechanism, while after having loaded the film cartridge the releasing mechanism is returned to a position at which the film reversion mechanism is prevented from operating.

The third object of the present invention is to offer a motion picture camera using a film cartridge in whose film winding up shaft a releasable reversion preventing mechanism for preventing the reversed rotation of the film winding up shaft is provided, whereby special operation is not necessary for releasing the film reversion preventing mechanism.

The fourth object of the present invention is to offer a synchronous sound recording motion picture camera using a film cartridge in whose film winding up shaft a releasable reversion preventing mechanism for preventing the reversed rotation of the film winding up shaft is provided while the feeding of the film for synchronous sound recording is carried out by means of continuous driving means such as the capstan, the pinch rollers and so on, whereby a movable releasing means for releasing the film reversion preventing means is provided on the internal wall of the film cartridge containing chamber while the switch over of the continuous driving means into operation state such as the engaging operation of the pinch rollers with the capstan is mechanically linked with the operation of the movable release means in such a manner that when the driving means is out of operation, for example, when the pinch rollers are apart from the capstan the movable release means is recessed deep in the internal wall so that the film cartridge can be loaded in the motion picture camera easily while in functional engagement with the switching over of the driving means into the operation state, for example, with the movement of the pinch rollers toward the capstan the pin member serving as the release means advances into the release part at the center of the film winding up shaft of the film cartridge so as to release the reversion preventing mechanism.

The fifth object of the present invention is to offer a motion picture camera so designed that even when a film cartridge not presenting a release hole for the reversion preventing mechanism on the winding up shaft is loaded, the pin for releasing the reversion preventing mechanism may be used without damage.

The sixth object of the present invention is to offer a motion picture camera using a film cartridge in whose film winding up shaft a releasable reversion preventing mechanism for preventing the reversed rotation of the film winding up shaft is provided, whereby a movable releasing means for releasing the film reversion preventing mechanism is provided on the internal wall of the film cartridge containing chamber in such a manner that the release means is normally placed in a position recessed in the internal wall so that the film cartridge can be loaded easily in the motion picture camera while in functional engagement with the release operation during photographing after having loaded the film cartridge, the release means being brought into the operation state for releasing the reversion preventing mechanism.

The seventh object of the present invention is to offer a motion picture camera using a film cartridge in whose film winding up shaft a releasable reversion preventing mechanism for preventing the reversed rotation of the film winding up shaft is provided, whereby a movable releasing means for releasing the film reversion preventing mechanism is provided on the internal wall of the film cartridge containing chamber in such a manner that the release means is normally placed in a position recessed in the internal wall so that the film cartridge can be loaded easily in the motion picture camera while a film cartridge detecting member is provided in the film cartridge containing chamber in such a manner that at the last loading process of the film cartridge the external surface of the film cartridge works upon the film cartridge detecting means whereby the pin member serving as the release means advances into the release part at the center of the film winding up shaft of the film cartridge so as to release the reversion preventing mechanism.

Further other objects of the present invention will be disclosed in the following explanations made in accordance with the accompanying drawings.

BRIEF DESCRIPTION OF THE DRAWINGS

FIG. 3 shows the state in which reversion is prevented by means of the reversion preventing mechanism while FIG. 4 shows the state in which the reversion preventing mechanism is released by means of the pin member FIG. 5 shows the state in which the film cartridge is half loaded while, FIG. 6 shows the state in which the film cartridge is completely loaded in the film cartridge containing chamber of the motion picture camera so as to be ready for taking pictures;

FIG. 8 shows the state in which the cover of the film cartridge containing chamber of the motion picture is opened, in perspective view, FIGS. 9 and 10 show the relation between the winding up claw part of the film cartridge containing chamber of the motion picture camera and the shutter release mechanism seen from the above in section;

FIG. 11 shows the state in which the cover of the film cartridge containing chamber of the motion picture camera is opened, in perspective view, while FIGS. 12 and 13 show the film winding up shaft in the film cartridge containing chamber of the motion picture camera seen from the above, in partial section;

FIGS. 15, 16 and 17 show the sixth embodiment of the motion picture camera in accordance with the present invention using the film cartridge 1,1' shown in FIG. 1 and FIG. 2, the reversion preventing mechanism of which film cartridge can be released whereby, FIG. 15 shows the state in which the cover of the film cartridge containing chamber of the motion picture camera is opened, in front view, while, FIGS. 16 and 17 show the relation between the film winding up shaft of the motion picture camera and the pinch rollers seen from the front, in section.

DESCRIPTION OF THE PREFERRED EMBODIMENT

Below, several preferred embodiments of the motion picture camera in accordance with the present invention will be explained in detail according to the accompanying drawings.

Figure 1:
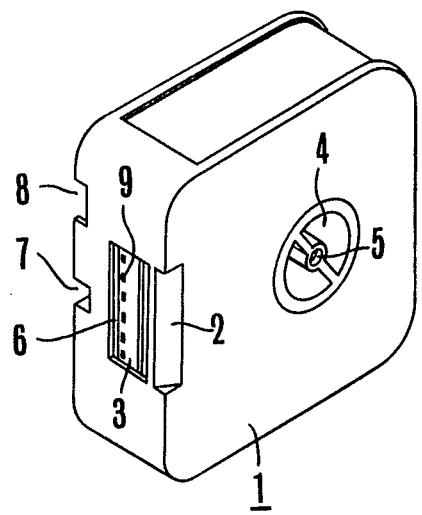
FIG. 1 shows a conventional film cartridge capable of only recording pictures and presenting a release means for the reversion preventing mechanism in the film winding up shaft in perspective view.
Figure 4:
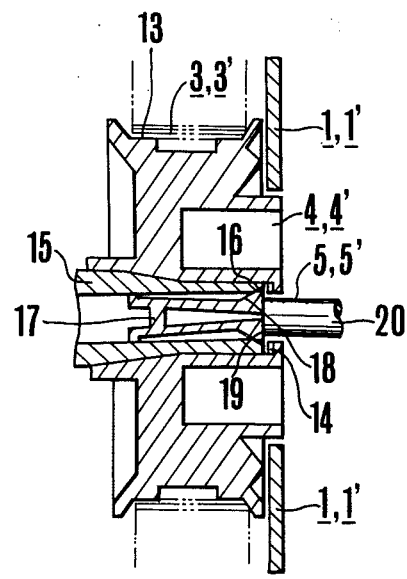
FIGS. 3 and 4 shows the film winding up shafts of the film cartridge and the reversion preventing mechanism in the film winding up shaft shown in FIG. 1 and FIG. 2 in section, whereby
Figure 3:
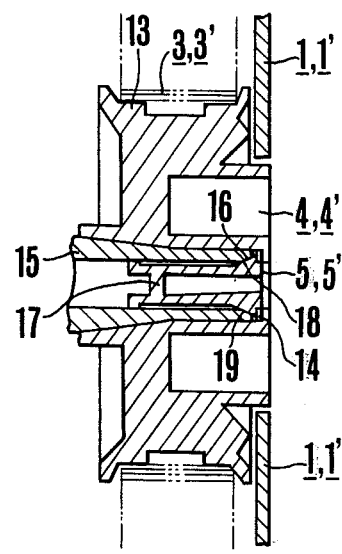

FIG. 1 shows a conventional light leakage free film cartridge easy to handle, capable of recording pictures and presenting a release device for the reversion preventing mechanism in the film winding up shaft in perspective view, whereby 1 is the film cartridge case, 2 the tapered part at the front end, 3 the film contained in the film cartridge case, 9 the perforation provided in the film 3, 6 the film exposure window, 7 the film position determining guide, 8 the notch for indicating the sensitivity of the film 3 and 5 the hole provided at the center of the film winding up shaft 4 in which hole the reversion preventing mechanism shown in FIGS. 3 and 4 is provided.

Figure 2:
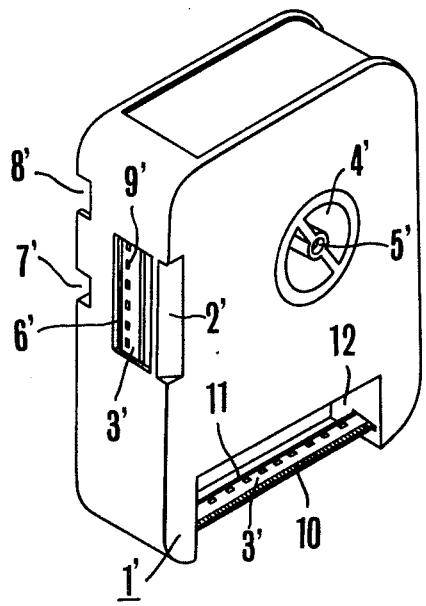
FIG. 2 shows a conventional film cartridge capable of recording both pictures and sounds and presenting a release means for the reversion preventing mechanism in the film winding up shaft in perspective view.

FIG. 2 shows a conventional light leakage free film cartridge easy to handle, capable of synchronous recording of the pictures and the sounds and presenting a release device for the reversion prevention mechanism in the film winding up shaft 4' similar to FIG. 1 in perspective view, whereby 1' is the film cartridge case corresponding to the film cartridge case shown in FIG. 1, 3' the film corresponding to film 3 shown in FIG. 1, 6' the film exposure window corresponding to the film exposure window 6 shown in FIG. 1, 7' the film position determining guide corresponding to the film position determining guide 7 shown in FIG. 1, 8' the notch corresponding to the notch 8 for indicating the film sensitivity shown in FIG. 1, 9' the perforations corresponding to the perforation 9 shown in FIG. 1, 10 the magnetic coating portion for sound recording provided on the film 3, 11 the balance zone portion of the magnetic coating portion 10, 12 the opening of the sound recording cartridge, 4 the film winding up shaft corresponding to the winding up shaft 4 shown in FIG. 1 in which winding up shaft a hole 5' is provided at the center similar to the winding up shaft 4 shown in FIG. 1 in which hole the reversion preventing mechanism shown in FIGS. 3 and 4 is provided.

The difference between the film cartridge for recording picture shown in FIG. 1 and the film cartridge for synchronous sound recording shown in FIG. 2 lies in the fact that the film cartridge for synchronous sound recording shown in FIG. 2 presents an opening 12 for sound recording while the film cartridge for recording pictures shown in FIG. 1 does not, while the difference between the film contained in the film cartridge for synchronous sound recording and the film contained in the film cartridge for recording picture lies in the fact that the film 3' contained in the film cartridge for synchronous sound recording shown in FIG. 2 presents a magnetic coating portion and the balance zone 11 while the film 3 contained in the film cartridge for recording pictures shown in FIG. 1 does not.

FIGS. 3 and 4 show the film winding up shaft 4, 4' of the film cartridge and the reversion preventing mechanism of the film winding up shaft 4, 4' shown in FIG. 1 and FIG. 2, respectively, in detail, whereby FIG. 3 shows the state in which the reversion preventing mechanism is in operation while, FIG. 4 shows the state in which the reversion preventing mechanism is released out of operation.

In the drawings 13 is the film winding portion of the winding up shaft 4, 4'. 14 is the projection in the shape of a ratchet claw for preventing the reversion provided inside of the hole 5, 5' of the winding up shaft 4, 4'. 15 is the fixed shaft around which the winding up shaft 4, 4' rotates. 16 is the tapered part at one end of the shaft 15. 17 is the reversion preventing member consisting of an elastic plastics and does not rotate relative to the shaft 15. 18 is the tapered part provided on the reversion preventing member 17, so as to be in contact with the tapered part 16. 19 is the end facing the hole 5', of the reversion preventing member 17, so as to engage with the projection 14. 20 shown in FIG. 4 is the pin member at the camera side. FIG. 3 shows the state before the film cartridge is loaded in the camera whereby the reversion preventing member 17 is pushed by means of the elasticity of the tapered part 18 to the right in the drawing so as to engage with the projection 14 of the winding up shaft 4, 4' by means of the end 19, so that the winding up shaft 4, 4' is prevented from free rotation while the film 3, 3' wound up around the film winding up portion 13 not shown in the drawing is prevented from becoming loose.

FIG. 4 shows the state in which the pin member 20 at the camera side has advanced into the hole 5, 5' at the center of the winding up shaft 4, 4' so as to push the end 19 of the reversion preventing member 17 to the left. In this state, the end 19 is apart from the projection 14, so that the winding up shaft 4, 4' is rotatable freely both forwards and backwards.

So far the outline of the preferred conventional film cartridge usable for the motion picture camera in accordance with the present invention has been explained.

Below the first embodiment of the motion picture camera in accordance with the present invention will be explained, whereby the reversion preventing mechanism can be released in case the film cartridge shown in FIG. 1 or FIG. 2 is used.

Figure 5:
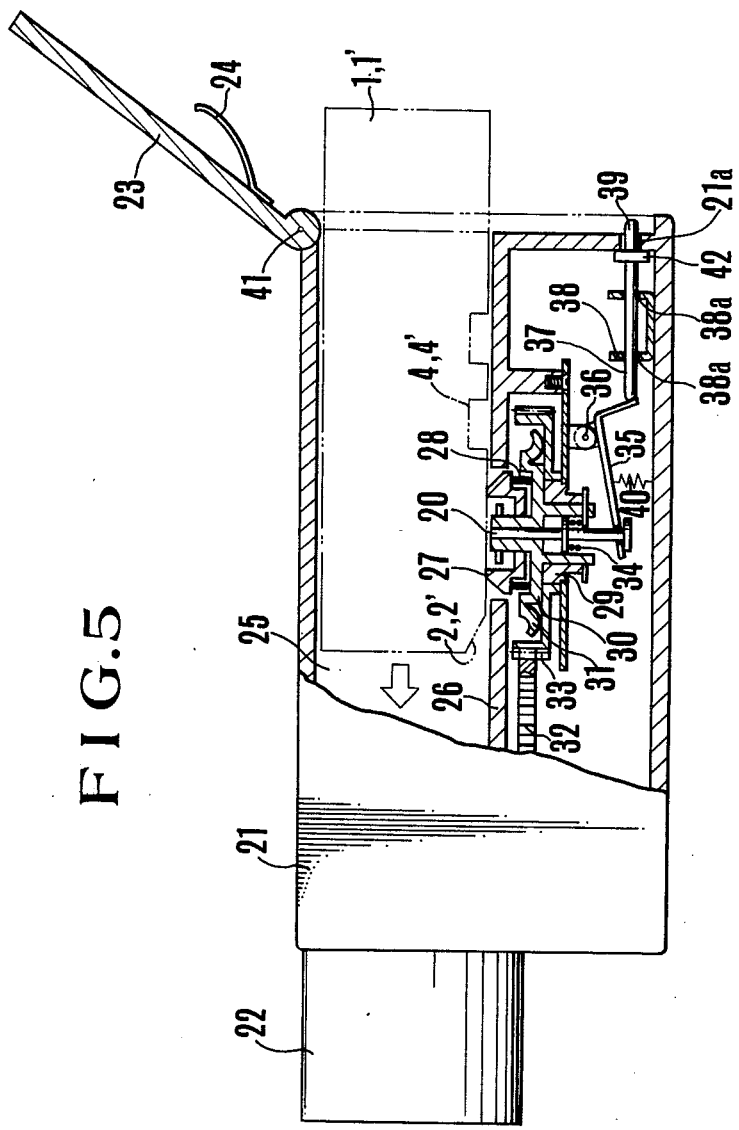
FIGS. 5 and 6 show the first embodiment of the motion picture camera in accordance with the present invention using the film cartridge shown in FIGS. 1 and 2, the reversion preventing mechanism of which film cartridge can be released, in plan view and partially in section for showing the film winding up shaft of the film cartridge and the film cartridge chamber, whereby
Figure 6:
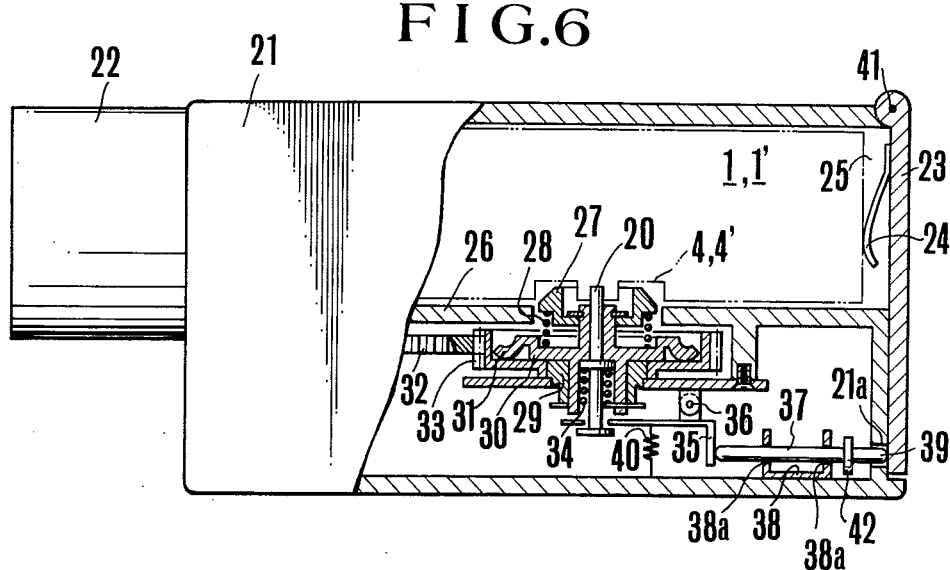

FIGS. 5 and 6 show a plan view of the first embodiment of the present invention partially in section for showing the winding up part of the film cartridge and the film cartridge containing chamber whereby, FIG. 5 shows the state in which the film cartridge 1, 1' is being loaded while, FIG. 6 shows the state in which the film cartridge 1, 1' has completely been loaded in the film cartridge containing chamber of the motion picture camera so as to be ready for taking pictures.

In the drawing, 21 is the camera body, 22 the lens barrel, 23 the cover of the film cartridge containing chamber which cover is connected with the camera body 21 by means of the pivot 41 provided on the camera body 21 in the manner of a hinge connection, 24 the film cartridge pushing spring for pushing the cartridge 1, 1' loaded in the film cartridge containing chamber 25 along the direction of the arrow, 26 the internal wall of the film cartridge containing chamber 25, 27 the winding up claw member, 28 the spring of the winding up claw member 27, so as to usually urge claw member 27 toward the film cartridge containing chamber 25, and 29 the fixed metal of the winding up part. 30 is the rotary member fixed on the winding up claw member 27, whereby the rotary member 30 presents a friction part 31 comprising one body with the circumference. 32 and 33 are the driving gears being driven by the driving power of the driving means, not shown in the drawing, so as to drive the winding up claw member 27 by means of the friction part 31 and the rotary member 30. 34 is the spring for driving pin member 20 so as to project into the film cartridge containing chamber. 35 is the bell crank rotatable around the shaft 36, whereby the one end engages with the pin member while the other end engages with the slide pin 37.

The slide pin 37 is in the slidable state in the guide hole 38a in the guide member 38 fixed on the camera body, whereby the one end 39 projects through the opening 21a at the back of the camera so as to detect the state of the cover of the film cartridge containing chamber. 42 is the control means for controlling the projecton of slide pin 37 projecting at the back of the camera body whereby the control means 42 is fixed on the slide pin 37 in such a manner that the control means 42 strikes the internal wall of the camera body 21 when the slide pin 37 projects through the opening 21a so as to prevent the slide pin 37 from projecting further. The bell crank 35 is usually driven counterclockwise by the force of the spring 40 larger than that of the spring 34 so as to keep the pin member 20 in the state shown in FIG. 5 until the cover of the film cartridge containing chamber is closed.

Below, the operation of such a motion picture camera as constructed above in accordance with the present invention will be explained. Now in the state shown in FIG. 5, the film cartridge 1, 1' has not yet been completely loaded in the film cartridge containing chamber 25, so that the film cartridge containing chamber 25 still remains in the state shown in full line in which the opening of the film cartridge containing chamber 25 is opened and not in the state shown in the dotted line in which the opening is closed. Thus the end 39 of the slide pin 37 is not in contact with the cover 23 of the film cartridge containing chamber so that the slide pin 37 is projects through the opening 21a at the back of the camera.

Therefore, the pin member 20 is recessed from the wall 26 of the film cartridge containing chamber by the effect of the spring 40 and the bell crank 35. When in this state, the film cartridge 1 is loaded in accordance with the drop in system along the direction of the arrow in the drawing, the winding up claw member 27 is pushed down by the tapered part 2 at the front end of the film cartridge so as to be recessed in the film cartridge containing wall 26 and assume the position shown in the drawing, whereby when the film cartridge 1, 1' is slided further to the left, the film cartridge 1, 1' is loaded at the determined position in such a manner that the winding up claw 27 engages correctly with the winding up shaft 4, 4' of the film cartridge. FIG. 6 shows the next state, namely the state in which the cover 23 of the film cartridge containing chamber is closed. The cover 23 of the film cartridge containing chamber is kept closed by means of a conventional locking means. By means of the closing operation of the cover 23 of the film cartridge containing chamber the end 39 of the slide pin is driven to the left in the drawing due to the pressure produced when the cover 23 of the film cartridge containing chamber is brought to the closed state so as to drive the bell crank 35 clockwise. Thus the pin member 20 is freed from the binding force of the bell crank 35 so as to project into the film cartridge containing chamber 25 by means of the force of the spring 34 in such a manner that the pin member 20 pushes the center of the winding up shaft 4, 4' of the cartridge as shown in FIG. 4 so as to release the reversion preventing mechanism of the film cartridge. Thus, by means of the construction in accordance with the present invention, it has become possible to realize a motion picture camera presenting a release device for the reversion preventing mechanism and still capable of loading film cartridge in accordance with the drop in system.

Figure 7:
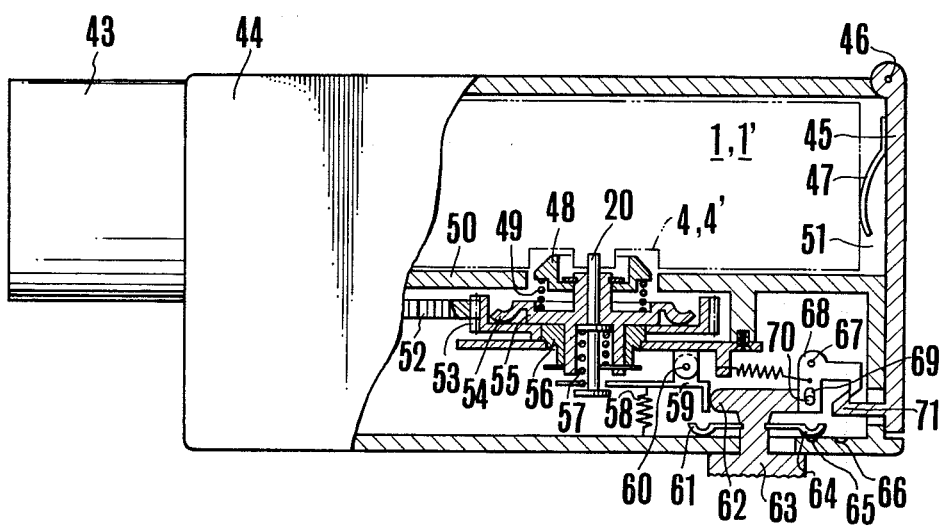
FIG. 7 shows the second embodiment of the motion picture camera in accordance with the present invention using the film cartridge shown in FIGS. 1 and 2, the reversion preventing mechanism of which film cartridge can be released, in plan view and partially in section.

FIG. 7 shows the plan view of the second embodiment of the motion picture camera in accordance with the present invention which is capable of using a film cartridge presenting the reversion preventing mechanism shown in FIGS. 1 and 2, whereby the film cartridge 1, 1' has been completely loaded in the film cartridge containing chamber of the motion picture camera so as to be ready for taking pictures.

In FIG. 7, 44 is the camera body corresponding to that 21 shown in FIGS. 5 and 6, 45 the cover of the film cartridge containing chamber corresponding to 23, 46 the supporting shaft corresponding to 41, 47 the film cartridge driving spring corresponding to 24, 51 the film cartridge containing chamber corresponding to 25, 50 the internal wall corresponding to 26, 48 the winding up member corresponding to 27, 57 the spring corresponding to 28, 56 the fixed metal corresponding to 29, 55 the rotary member corresponding to 30, 54 the friction member corresponding to 31, 52 and 53 the driving gears corresponding to 32 and 33, and 57 the spring corresponding to 34, whereby their constructions are same as shown in FIGS. 5 and 6. 71 is the locking claw provided on the cover 45 of the film cartridge containing chamber, 63 the lock operation nob, 62 the projection composed as one body with the lock operation nob 63, and 68 the lock crank for engaging with the lock claw 71 provided on the cover 45 whereby the lock crank 68 presents a long groove 69 in which the pin provided on the lock operation nob 63 engages in such a manner that by engaging the pin 70 in the long groove 69, the operation of the lock operation nob 63 is transferred to the lock crank 68 so as to release the lock of the cover 45 of the film cartridge containing chamber. 67 is the rotatable shaft for rotatably mounting the lock crank 68. 64 is the click spring fixed on the lock operation nob 63 as one body, 65 and 66 the click grooves for the closed position for the opened respectively position. In the drawing, the state corresponding to that of the first embodiment shown in FIG. 6, namely after the film cartridge is loaded is shown. In this state, the lock operation nob 63 is located to the left while the click spring 61 engages in the click groove 65 for the closed position and the lock crank 68 engages with the lock claw 71 of the cover 45 of the film cartridge containing chamber whereby the cover 45 is closed while the projection 62 drives the bell crank 59 clockwise and the pin member 20 projects into the film cartridge containing chamber 51, so as to release the reversion preventing mechanism of the film cartridge. When in this state, the lock operation nob 63 is slid to the right in the drawing, the cover 45 of the film cartridge containing chamber is opened while the bell crank 59 is driven counterclockwise by means of the spring 58 so as to draw down the pin member 20 in such a manner that the pin member 20 is recessed deep in the face of the internal wall 50 of the film cartridge containing chamber namely in the state corresponding to that shown in FIG. 5. Thus it is possible to take out the film cartridge 1, 1' from the film cartridge containing chamber 51 by sliding the film cartridge to the right.

Figure 8:
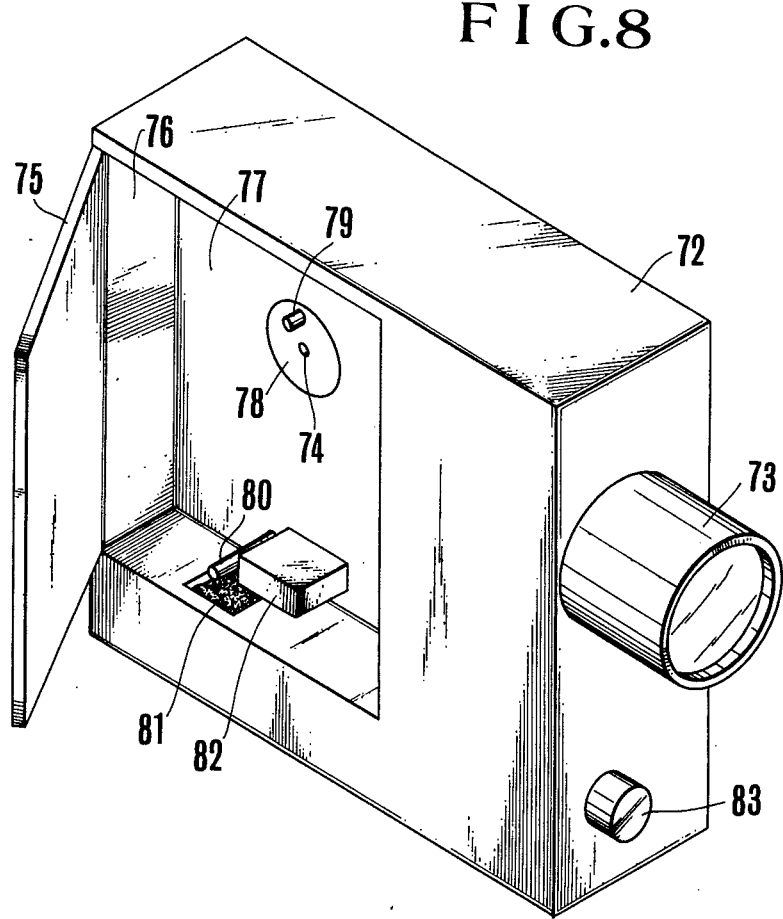
FIGS. 8, 9 and 10 show the third embodiment of the motion picture camera in accordance with the present invention using the film cartridge shown in FIG. 1 and FIG. 2, the reversion preventing mechanism of which film cartridge can be released whereby
Figure 9:
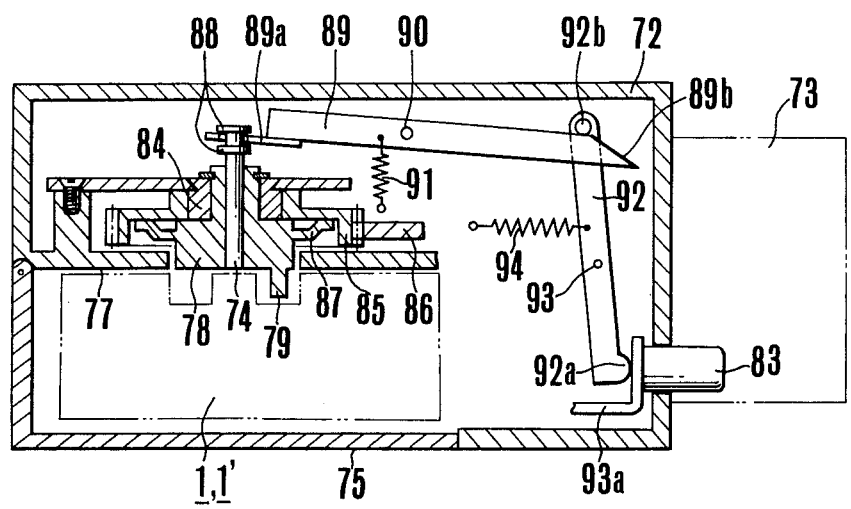
Figure 10:
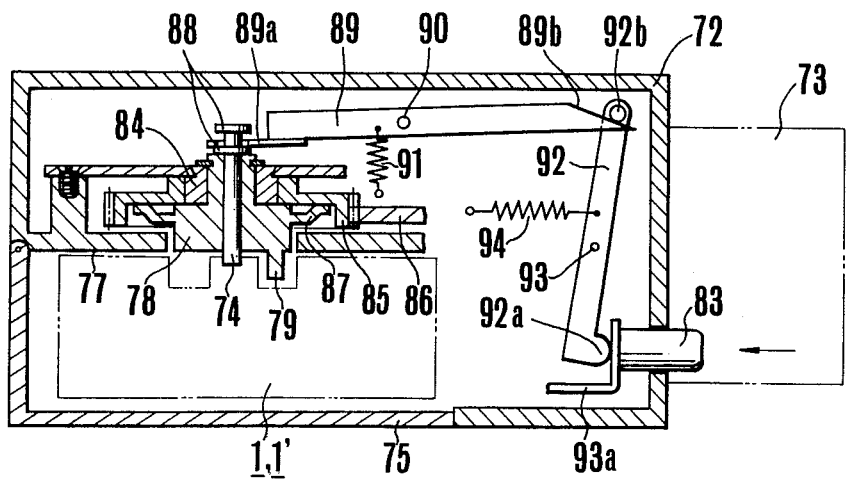

FIGS. 8, 9 and 10 show the third embodiment of the motion picture camera in accordance with the present invention which is at least capable of using the film cartridge presenting the reversion preventing mechanism shown in FIGS. 1 and 2, more particularly, the embodiment of the release means for releasing the reversion preventing mechanism in functional engagement.

FIG. 8 shows the open state of the cover of the film cartridge containing chamber in the motion picture camera in accordance with the present invention in perspective view, while FIGS. 9 and 10 show the relation between the winding up claw member in the film cartridge containing chamber of the motion picture camera and the shutter release mechanism seen from the above in section.

In FIG. 8, 72 is the camera body, 73 the lens barrel and 75 the cover of the film cartridge containing chamber. 76 is the film cartridge containing chamber, 77 the internal wall of the chamber. 78 is the winding up shaft, 79 the claw provided on the winding up shaft 78. 80 is the capstan for feeding film for synchronous sound recording, 81 the pinch rollers and 82 the sound recording head. 83 is the shutter release button. The drawing shows the state in which the pin member 74 corresponding to the pin 20 shown in FIG. 4, at the center of the winding up shaft is recessed from the film cartridge containing chamber 76, deep in the surface of the internal wall 77 of the film cartridge containing chamber.

FIG. 9 shows the state in which the release button 83 is not operated while FIG. 10 shows the state in which the release button 83 is pushed. In the drawing, 84 is the bearing for the film winding up shaft 78, 85 the winding up gear and 86 the driving gears in engagement with the winding up gear 85, whereby the driving gears are driven by the driving force from the driving, not shown in the drawing, so as to drive the winding up gear 85. 87 is the friction part for transmitting the rotation of the gear 85 to the winding up shaft 78. 88 is the flange parts of the pin member 74, clamping the one end 89a of the lever 89. 89b is the other tapered end of the lever 89, whereby the lever 89 is usually driven counterclockwise by means of the spring 91 around the shaft 90.

The lever 92 engages with the release button 83 with the one end 92a and with the tapered part 89b of the lever 89 with the pin 92b provided at the other end, whereby the lever is rotatable around the shaft 97 and usually driven counterclockwise by means of the spring 94. 93a is the connecting member with the conventional release mechanism not shown in the drawing.

In the state shown in FIGS. 8 and 9, the pin member 74 is recesses from the film cartridge containing chamber 76 completely into the surface of the internal wall 77 of the film cartridge containing chamber so that the film cartridge 1, 1' can easily be loaded either from the back of the motion picture camera in accordance with the drop in system or from the side face of the motion picture camera.

FIG. 10 shows the next state in which the release button 83 is pushed along the direction of arrow for taking pictures. In functional engagement with the operation of the release button 83, the one end 92a of the lever 92 is also pushed so as to rotate around the shaft 93. Thus the pin 92b provided at the other end of the lever 92 is rotated into the position at which the pin 92b is in contact with the tapered part 89b of the lever 89, whereby the lever 89 is rotated counterclockwise by means of the spring 91 in such a manner that the other end 89a of the lever 89 pushes down the flange parts 88 of the pin member 74, so that the pin member 74 projects into the film cartridge containing chamber 76 at the center of the winding up shaft 79. Thus the reversion preventing mechanism of the winding up shaft 4, 4' of the film cartridge 1, 1' shown in the imaginary line is released into the state shown in FIG. 4.

Further, by bringing the release button 83 out of operation at the termination of taking pictures, the pin member 74 is returned to the state shown in FIG. 9 again.

The third embodiment is so designed that no damage is caused to the release mechanism even when the film cartridge, without the opening 5 for selectively releasing the reversion preventing mechanism as in the film cartridge shown in FIGS. 1 to 4. The film cartridge incapable of releasing the reversion preventing mechanism can still be loaded in the motion picture camera.

The reason for the above will be explained below. Now let us suppose that in the state shown in FIG. 9 instead of the film cartridge 1, 1' capable of releasing the reversion preventing mechanism a film cartridge without the release member for the reversion preventing mechanism be loaded in the motion picture camera. In the state shown in FIG. 10, in which the release button 83 is pushed down, the pin member is unable to project out of the internal wall 77 of the film cartridge containing chamber 76 into the film cartridge containing chamber 76 because the film cartridge does not present the hole of the release member in the winding up shaft.

Even if the pin 92b at the one end of the lever 92 driven clockwise by means of the release button 83 is switched from the state shown in FIG. 9 over into the state shown in FIG. 10 at this time, the pin member 74 is prevented from moving by the film cartridge so that the lever 89 is kept in the state shown in FIG. 9, whereby the spring 91 is kept tensed. Therefore, in this state the tapered part 89b of the lever 89 is apart from the pin 92b of the lever 92.

Namely, the force of the release button 83 can not be transmitted beyond the pin 92b in such a manner that even with the film cartridge without the release means for the reversion preventing mechanism it is possible to take pictures without any problem such as damage of the mechanism.

Further, the case of the motion picture camera, the release button 83 is often brought out of operation in order to change the scene while one film cartridge is used whereby in case of this third embodiment the state shown in FIG. 10 can be brought in the state shown in FIG. 9 in such a case so that the film reversion preventing mechanism of the film cartridge is brought into operation in such a manner that the film during the pause of taking a picture is prevented from becoming loose while it is possible to position the film for the next scene correctly.

Figure 11:
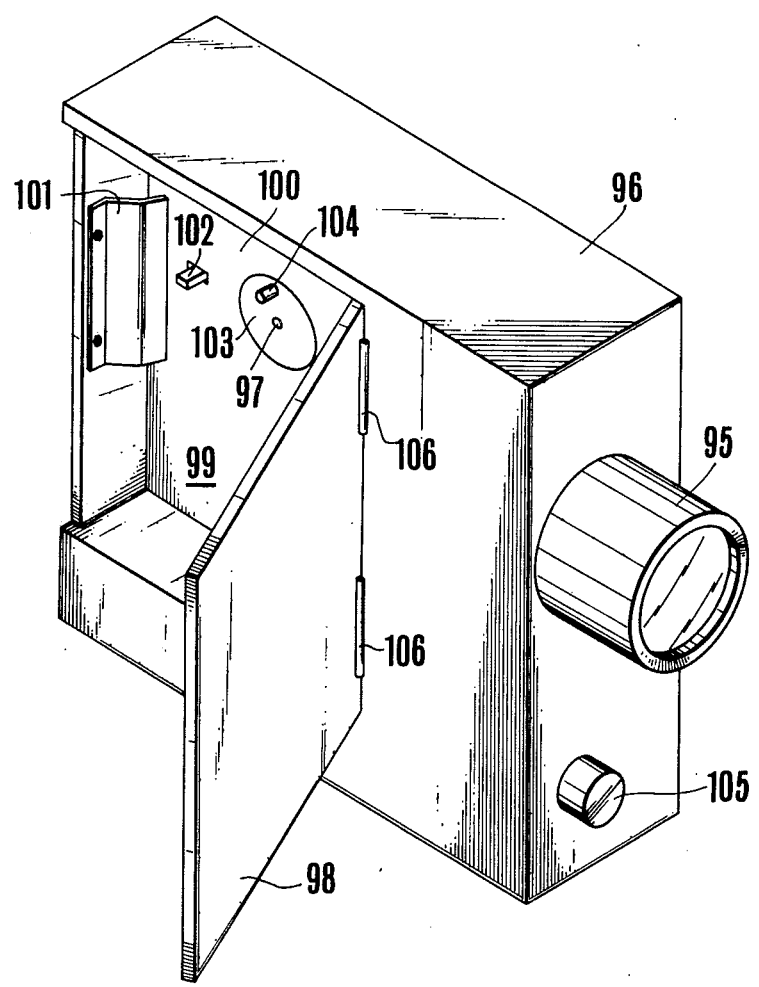
FIGS. 11, 12 and 13 show the fourth embodiment of the motion picture camera in accordance with the present invention using the film cartridge shown in FIG. 1 and FIG. 2 the reversion preventing mechanism of which film cartridge can be released whereby.
Figure 12:
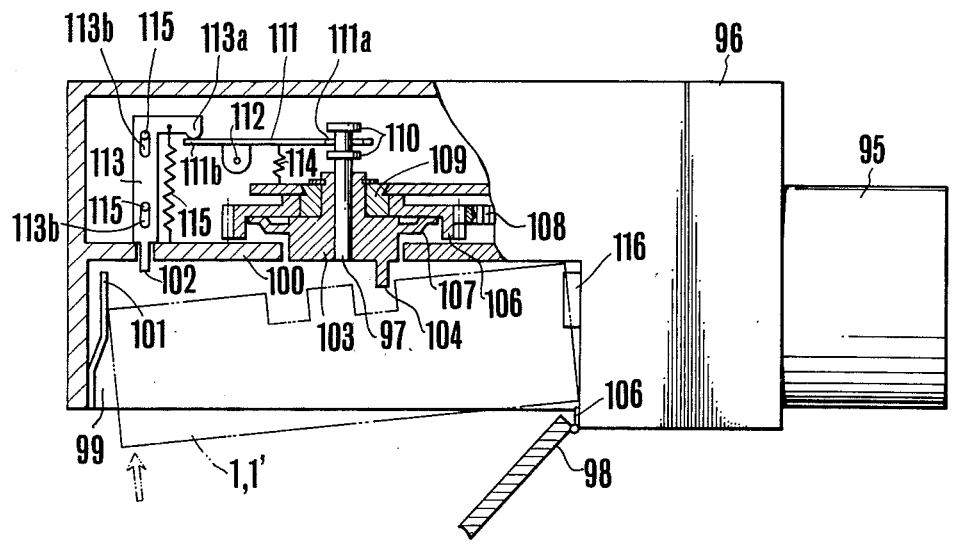
Figure 13:
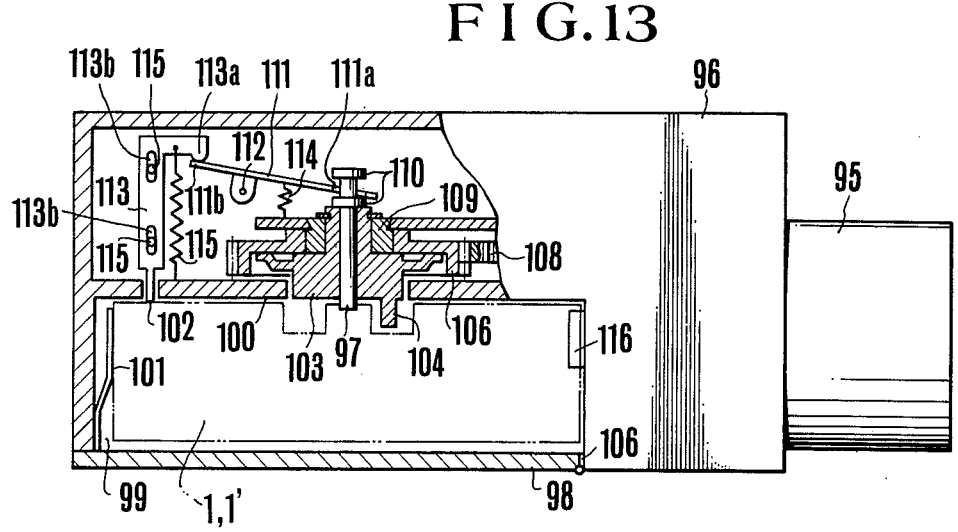

FIGS. 11, 12 and 13 show the fourth embodiment of the motion picture camera in accordance with the present invention which is at least capable of using the film cartridge presenting the reversion preventing mechanism shown in FIGS. 1 and 2, whereby FIG. 11 shows the state of the open cover of the film cartridge containing chamber of the motion picture camera in perspective view while, FIGS. 12 and 13 show the winding up shaft of the film cartridge containing chamber seen from above in partial section.

In FIG. 11, 96 is the camera body, 95 the lens barrel and 98 the cover of the film cartridge containing chamber, being provided on the camera body 96 by means of the hinge 106. 99 shows the film cartridge containing chamber while 100 shows the internal wall. 101 is the film cartridge holding spring for driving the film cartridge toward the front of the motion picture camera in the film cartridge containing chamber when the film cartridge is loaded in the film cartridge containing chamber. 102 is the film cartridge detecting member for detecting whether the film cartridge is loaded in the film cartridge containing chamber. 103 is the winding up shaft while 104 is the claw provided on the winding up shaft 103. 93 is the pin member corresponding to 20 shown in FIGS. 5 and 6. 105 is the release button. In the state shown in the drawing, the pin member 97 at the center of the winding up shaft 103 is recessed from the film cartridge containing chamber deep into the surface of the internal wall 100.

FIG. 12 shows the film cartridge 1, 1' shown in imaginary line being half loaded in the motion picture camera whereby 109 is the bearing of the winding up shaft, 106 the winding up gear and 107 the friction part for transmitting the rotation of the gear 106 to the winding up shaft 103. 108 is the relay gear for transmitting the rotation from a driving means, not shown in the drawing, to the winding up gear 106. 110 is the flange parts of the pin member 97, clamping the one end 111a of the lever 111. The other end 111b of the lever is usually in contact with the one end 113a of the slide member 113. 112 is the rotary shaft of the lever 111 whereby the lever 111 is usually driven clockwise by means of the spring 114. The slide member 113 is slidable by means of the long groove 113b in which the shaft 115 fixed on the body 96 engages, making one body with the film cartridge detecting member 102, whereby the film cartridge detecting member 102 is usually driven by the spring along the direction along which the film cartridge detecting member 102 projects into the film cartridge containing chamber 99. The spring 115 is so designed that its force is greater than that of the spring 114 in such a manner that the pin member 97 is usually kept in the state shown in FIGS. 4 and 5 in which the pin member 97 is recessed deep in the surface 100 of the internal wall of the film cartridge containing chamber. In this state, the film cartridge 1, 1' shown in the imaginary line can be loaded in the motion picture camera without difficulty because the pin member 97 is recessed in the surface of the internal wall of the film cartridge containing chamber.

FIG. 13 shows the state in which the film cartridge 1, 1' shown in the imaginary has been loaded. By pushing further the film cartridge from the position shown in FIG. 12 along the direction of arrow the (FIG. 12), the positioning of the film cartridge is controlled by the film cartridge holding spring 101 in such a manner that at the time at which the external surface of the film cartridge 1, 1' is in contact with the film cartridge detecting member the exposure opening 6, 6' for exposing the film 3, 3', of the film cartridge correctly corresponds to the exposure opening of the film gate 116 so that the release hole 5, 5' at the center of the winding up shaft of the film cartridge correctly corresponds to the position of the pin member 97. When in this state, the film cartridge detecting member 102 is pushed, the slide member 113 moves upwards in the drawing whereby the one end 113a of the slide member 113 allows the lever 111 to act clockwise so that by means of the effect of the spring 114 the one end 111a of the lever 111 pushes down the pin member 97 through the flange part 110 and then the pin member 97 projects from the external surface of the winding shaft 103 toward the film cartridge containing chamber 99 so that the film cartridge 1, 1' is placed in the state shown in FIG. 4 in which the pin member 97 projects into the release hole 5, 5' at the center of the winding shaft of the film cartridge 1, 1', so as to release the reversion preventing mechanism. Thus, it is possible for a photographer to take pictures without any other special operation.

Now, let us suppose that in case of the present embodiment in the state shown in FIG. 12, a film cartridge without the release part for the reversion preventing mechanism is loaded, as explained in case of the third embodiment, into a motion picture camera instead of the film cartridge 1, 1' capable of releasing the reversion prevention mechanism. Because this film cartridge does not present any hole in the release part at the center of the winding up shaft, even if the film cartridge detecting means 102 is pushed by the film cartridge, the pin member 97 is prevented from projecting by means of the winding shaft of the film cartridge whereby the force is absorbed by the spring 114. Therefore, the state in which such a film cartridge has been loaded corresponds to the state shown in FIG. 13, whereby only the pin member 97 and the lever 111 remain in the state shown in FIG. 12. In short, even if the slide member 113 is slid by means of the film cartridge detecting member 102, the effect can not be transmitted beyond the lever 111, so that even if a film cartridge without the release part for the reversion preventing mechanism is used it is possible to take pictures without any problem such as damage.

Figure 14:
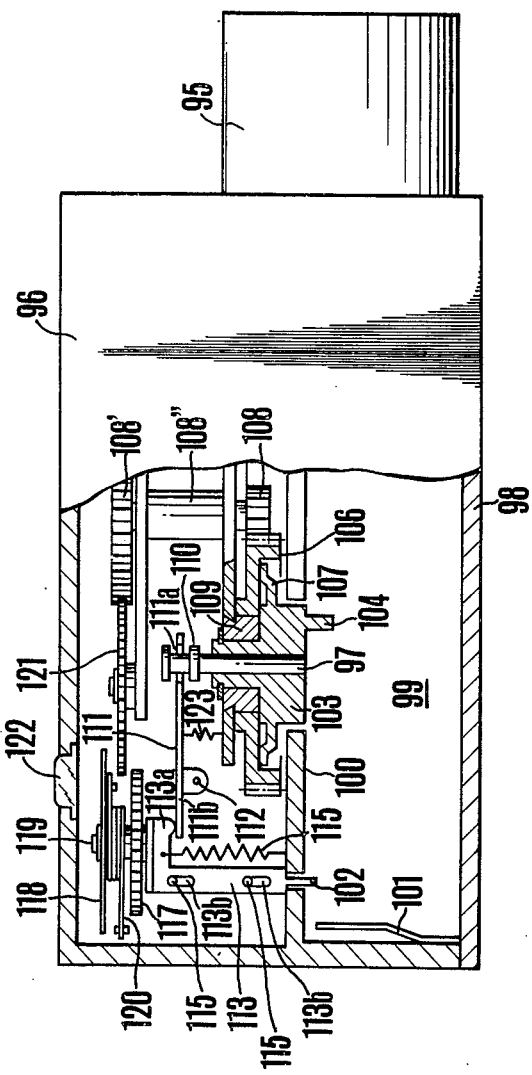
FIG. 14 shows the fifth embodiment of the motion picture camera in accordance with the present invention as a variation of the motion picture camera shown in FIGS. 11 to 13 in plan view, partially in section

FIG. 14 shows the fifth embodiment of the motion picture camera in accordance with the present invention as a variation of the fourth embodiment shown in FIGS. 11, 12 and 13, whereby the film cartridge detecting member 102 is so designed as to serve as the starting and zero setting member of the footage counter at the same time. Here the same members as those in FIGS. 11, 12 and 13 are represented by the same characters so that their explanations are omitted.

Below, only other members than those in FIGS. 11, 12 and 13 will be explained. In FIG. 14, 121 is the footage counter operating gear being rotated by the relay gear 108' which is fixed on the shaft 108'' and rotates with the relay gear 108 as one body. 119 is the rotary shaft of the counter, rotatably mounted on the slide member 113, 117 the counter gear rotatable with the rotary shaft 119 of the counter as one body, 118 the counter scale mounted on the rotary shaft 119 of the counter, 120 the zero setting spring for selectively returning the counter scale plate 118 to the starting position and 122 the indication window provided on the casing of the motion picture camera through which window the position of the scale plate 118 can be seen. Now, in the state shown in the drawing, in which the film cartridge is not loaded, the film cartridge detecting member 102 is in the state out of operation, projecting into the film cartridge containing chamber while the footage counter provided on the slide member 113 making one body with the film cartridge detecting member is also in the state out of operation. When now the film cartridge is loaded, the film cartridge detecting member 102 is pushed by the film cartridge so that the pin member 97 is brought into operation while the slide member 113 is slid upwards in the drawing whereby the gear 117 of the footage counter provided on the slide member 113 engages with the operation gear 121 in such a manner that by operating the release for taking pictures the footage counter operates and the rotation of the scale plate 118 is indicated through the indication window 122.

By taking out the film cartridge after finishing photographing, the film cartridge detecting member 102 is returned to the state shown in the drawing by means of the spring 115 whereby the gear 117 is apart from the operation gear 121 again and the scale plate 118 is returned to zero by means of the spring 120. By making the film cartridge detecting means for releasing the reversion preventing mechanism of the film cartridge serve as the member for starting and zero setting of the conventional footage counter provided on the motion picture camera in this way, it is possible to fulfill the purpose without providing any special members in the film cartridge containing chamber, which is very profitable. Further, the member serving as the film cartridge detecting means at the same time need not necessarily be the above mentioned starting and zero setting member of the footage counter, but can be any other conventional member such as the film sensitivity setting means or the like.

Figure 15:
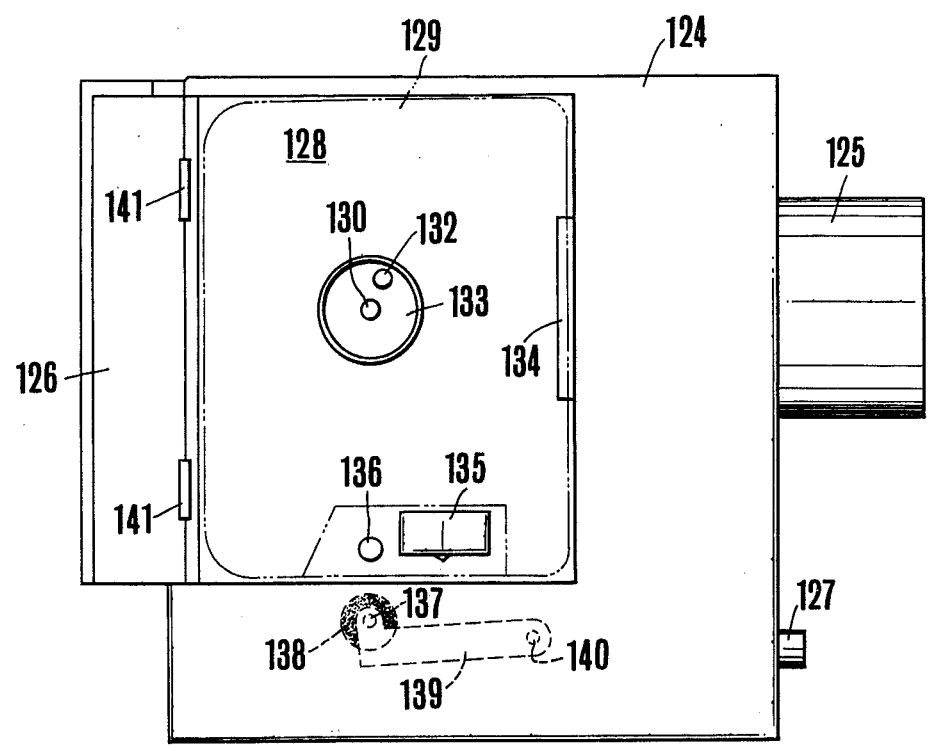

FIGS. 15, 16 and 17 show the sixth embodiment of the synchronous sound recording motion picture camera in accordance with the present invention which is at least capable of using the film cartridge presenting the reversion preventing mechanism shown in FIGS. 1, 2 and 3, whereby FIG. 15 shows the cover of the film cartridge containing chamber of the motion picture camera in front view, while FIGS. 16 and 17 show the relation between the winding shaft of the motion picture camera and the pinch roller seen from the above in section.

In FIG. 15, 124 is the camera body, 125 the lens barrel, 126 the cover of the film cartridge containing chamber, being mounted on the camera body 124 by means of the hinge member 141, 127 the lens button, 128 the film cartridge containing chamber, and 129 the internal wall of the film cartridge containing chamber 128. 134 is the film gate for taking pictures, 135 the synchronous sound recording head for recording the sounds on the film 3' at the same time of exposure, and 136 the capstan for feeding the film 3' at a constant speed at the synchronous sound recording head. 138 is the pinch roller being mounted on the arm 139 by means of the rotary shaft. 140 is the rotary shaft of the arm 139 fixed on the main body. 133 is the winding up shaft while 132 is the claw provided on the winding up shaft 133. 130 is the pin member corresponding to 20 of the first embodiment shown in FIGS. 5 and 6. Hereby the film cartridge shown in dotted line in the drawing and being contained in the film cartridge containing chamber 128 is the one shown in FIG. 2 and capable of recording the pictures and the sounds at the same time.

Now, in the state shown in the drawing in which the pinch roller 138 is apart from the capstan 136, the pin 130 at the center of the winding up shaft is recessed deep into the surface of the internal wall 129 of the film cartridge containing chamber. FIG. 16 shows the state in which the pinch roller 138 is apart from the capstan 136. 149 is the winding up gear, 143 the bearing of the winding up shaft and 142 the friction member for transmitting the rotation of the winding up gear 149 to the winding up shaft. The one end 144a of the lever 144 is clamped by means of the flange provided on the pin member 130, while the other end 144b is usually in contact with the one end 147a of the crank member driven clockwise by means of a spring means not shown in the drawing. Lever 144 is rotatable around the shaft 146 fixed on the main body 124, being driven counterclockwise by means of the spring 145. The other end 147b of the crank member 147 is bent, being usually in contact with the pin 137a making one body with the pinch roller shaft 137. In the state shown in the drawing, the pinch roller 138 is apart from the capstan 136 by means of the pinch roller operation member, allowing the film cartridge 1' containing the film 3' exposed to the opening 12 for recording the sounds as shown in FIG. 2 to be loaded in the motion picture camera whereby the pin 137a allows the bent part 147 of the crank member 147 to move upwards, keeping the crank member 147 at the position at which the crank is driven counterclockwise. In this way, the pin member 130 is ready to project into the film cartridge containing chamber by means of the lever 144 driven by the spring 145 whereby the other end 144b of the lever 144 is prevented from rotating by means of the one end 147a of the crank member, being kept in the state shown in FIG. 16.

FIG. 17 shows the state in which the film cartridge 1' shown in an imaginary line is inserted into the film cartridge containing chamber 128 and out of the state shown in FIG. 16, whereby the operation of the pinch roller the arm 139 of the pinch roller 138 shown in FIG. 15 is rotated around the shaft 140 so as to be brought into contact with the capstan 136 under pressure by means of the force of a spring not shown in the drawing. In accordance with the movement of the pinch roller 138 out of the state shown in FIG. 16 into the state shown in FIG. 17 the pin 137a is moved upwards and therefrom, the bent part 147b of the crank member 147 is released from the pin member 137a in such a manner that the lever 144 usually driven by the spring 145 is allowed to rotate counterclockwise. Thus the one end 144a of the lever 144 moves the flange part 130' of the pin member 130 to the left in such a manner that the pin member 130 projects into the film cartridge containing chamber 127, entering into the release hole 5' of the reversion preventing mechanism at the center of the winding shaft of the film cartridge 1' as shown in FIG. 4, so as to release the reversion preventing mechanism.

Further, when the film cartridge 1' is taken out of the film cartridge containing chamber 128 after having finished taking pictures in case of the synchronous sound recording motion picture camera, by the unavoidable separating motion of the pinch roller from the capstan 136 the pin member 130 is automatically recessed so that no special operation is needed to release the reversion preventing mechanism of the film cartridge.

Now, let us suppose that out of the state shown in FIG. 16, a cartridge without a release part for the reversion preventing mechanism is loaded instead of the film cartridge 1'. Because this film cartridge does not present the release hole at the center of the winding shaft, even if by the movement of the pinch roller 138 the bent part 147b of the crank member 147 is freed, the pin member 130 is prevented from projecting by the winding shaft of the film cartridge. Namely, the state in which the film cartridge has been loaded corresponds to that shown in FIG. 17, whereby the pin member 130 and the lever 144 are kept in the state shown in FIG. 16, being out of functional engagement with the crank member 147. Namely, even if the pinch roller 138 is displaced, the effect is not transmitted from the lever 144 to the pin member 130 so that it is possible to take pictures without any problem of damage in the mechanism when the film cartridge does not have a release part for the reversion preventing mechanism.

In the above mentioned sixth embodiment, the capstan and the pinch roller are adopted as the continuous driving means for driving the film at the sound signal recording part of the film cartridge at a constant speed, whereby it goes without saying that the means can be replaced with other means for feeding the film continuously such as sprocket.

The purpose of the above mentioned sixth embodiment is to offer a synchronous sound recording motion picture camera which presents a means for releasing the reversion preventing mechanism, being capable of projecting into the film cartridge containing chamber but usually kept in the state out of operation, the means for feeding the film for synchronous sound recording and the functionally engaging means for making the release means project in accordance with the operation of the film feeding means so that when the film cartridge presenting the film exposure opening and the sound signal recording opening keeping a certain determined length of film exposed is loaded into the motion picture camera, the loading of the film cartridge should be difficult, if the release means would project into the film cartridge containing chamber, which difficulty can be avoided by the present invention. Especially in functional engagement with the film feeding means assuming the operation state for feeding the sound signal recording film to the sound recording opening continuously at a constant speed the reversion preventing mechanism is released at the same time when the motion picture camera completely becomes ready for the synchronous sound recording, which is very profitable. Hereby, further, the automatic release operation is possible, so that the so far troublesome operation of the synchronous sound recording motion picture camera becomes very simple.

What is claimed is:

1. A motion picture camera provided with a cartridge chamber to be charged with a film cartridge of the type having a disengageable reversion preventing mechanism and a device for selectively disabling the reversion preventing mechanism of said film cartridge charged within said cartridge chamber, said camera further comprising an elongate pin having a head portion thereof, said portion being selectively engageable with the reversion preventing mechanism of said film cartridge charged within said cartridge chamber, said elongate pin further having a flange for limiting the extension of the head portion into said cartridge chamber; means mounting thereon said elongate pin for movement between a first position wherein said head portion is effective to disable the reversion preventing mechanism of said charge cartridge and a second position wherein said elongate pin is in a retracted position relative to the cartridge chamber so as to be ineffective to disable said reversion preventing mechanism; first means for urging said elongate pin toward said first position, said urging means having a spring being engageable with said pin; blocking means for retaining forcedly said elongate pin in said second position against the force of said urging means until the charging or removing of said cartridge into or from the cartridge chamber is completed; said blocking means comprises a second urging means for urging said elongate pin toward said second position with a force larger than the force of said first urging means which effects to urge said elongate pin toward said first position, and a release member for overcoming the energizing force of said second urging means so as to permit the displacement of said elongate pin to said first position.

2. A motion picture camera according to claim 1, wherein said second urging means comprises a rotatable bell-crank member mechanically linked at one end thereof to said elongate pin while at the other end thereof to said release member, and a spring engaged with said bell-crank member to impart an energizing force to said bell-crank member so as to urge said elongate pin toward said second position via said member.

3. A motion picture camera according to claim 1, wherein said cartridge chamber comprises a cover selectively opening or closing an aperture through which a cartridge is charged into or removed from said chamber, said aperture being formed at one portion of said chamber and a locking member for selectively locking said cover in a closed state, said locking member in said closed state being mechanically linked with said release member to control said release member so as to overcome the energizing force of said second urging means.

4. A motion picture camera according to claim 1, wherein said cartridge chamber comprises at one portion thereof a cover for selectively closing an aperture through which a cartridge is charged into said chamber, and said release member is slidably mounted to be protruded or retracted at one end thereof from the closed position of said cover when it be closed as well as to control said second urging means so as to overcome the energizing force of said second urging means by virtue of retreating from the closed position of said cover due to the pressure of said cover generated when it is closed.

5. A motion picture camera provided with a cartridge chamber adapted to be charged with a film cartridge having a disengageable reversion preventing mechanism, a disabling device comprising:
   a. a disengaging member having an elongate portion, said portion being selectively engaged with the reversion preventing mechanism of said film cartridge charged within said cartridge chamber, said disengaging member further having a flange portion for limiting extension of the elongate portion into the cartridge chamber;
   b. a first means mounting thereon said disengaging member for the movement between a first position wherein said member is effective to disable the reversion preventing mechanism of a charged cartridge and a second position wherein said disengaging member is retracted and is ineffective to disable the reversion preventing mechanism;
   c. a first means for resiliently urging said disengaging member toward its first position from its second position;
   d. A second urging means for urging said disengaging member toward the second position from the first position with an energizing force larger than an energizing force of said first urging means as well as for detaining forcedly said disengaging member on said second position; and
   e. a release member actuated by selective operation from the exterior of said cartridge chamber after a predetermined action for charging or removing said cartridge into or from said cartridge chamber to overcome the energizing force of said second urging means so as to permit the displacement of said disengaging member to said first position.

6. A motion picture camera according to claim 5, wherein said second urging means comprises a rotatable bell-crank member mechanically linked at one end thereof to said disengaging member while at the other end thereof to said release member and a spring engaged with said bell-crank member for urging said disengaging member toward said second position.

7. A motion picture camera equipped with a cartridge chamber for charging therewithin a film cartridge, said film cartridge composed of a hollow cylindrical-shaped shaft having an opening in the center of said shaft, a film winding-up member rotatable about the shaft and a disengageable reversion preventing mechanism; said reversion preventing mechanism comprising a projection on the film winding-up member and a control member provided within the shaft to be movable along the shaft between a first position wherein the control member is engageable with the projection to prevent rotation of the reversion preventing mechanism in one direction and a second position wherein the control member is disengaged from the projection thereby permitting rotation of the film winding-up member in both directions, and a means for resiliently urging the control member toward its second position from its first position, thus said control member being imparted from the opening of said shaft toward said second position with an energizing force larger than the energizing force of said urging means so as to be capable of moving said second position, said camera further comprising:
   a. a mounting means forming a part of the peripheral wall surface of said cartridge chamber and having a hole having an opening thereof at the position nearly corresponding to the opening of said shaft when said film cartridge is charged within said cartridge chamber;
   b. an elongate pin having a head portion thereof, said head portion being selectively engageable with said control member of said film cartridge charged within said cartridge chamber, said elongate pin being slidably mounted at one portion thereof within the hole of said mounting means as well as being displaceable between a projecting position wherein said pin is engaged at the head portion thereof with said control member in such a way that said head portion is passed through the opening of said shaft so as to move said control member to the second position from said first position and a retracting position wherein said pin is retreated from said cartridge chamber so as to permit said control member to be located in said first position;
   c. a first means for resiliently urging said elongate pin toward its projecting position from its retracting position, said first means having a spring having an energizing force larger than the energizing force imparted by the urging means of said film cartridge;
   d. a second urging means for urging said elongate pin toward the retracting position from the projecting position with an energizing force larger than the energizing force of said first urging means so as to detain forcedly said pin in said retracting position; and
   e. A release member actuated by a selective operation from the exterior of said cartridge chamber so as to permit the displacement of said elongate pin to said projecting position by virtue of overcoming the energizing force of said second urging means.

8. A motion picture camera according to claim 7, wherein said second urging means comprises a rotatable bell-crank member mechanically linked at one end thereof to said elongate pin while at the other end thereof to said release means and a spring engaged with said bell-crank member, said bell-crank member being imparted an energizing force so as to be able to urge said elongate pin toward said retracting position.

9. A motion picture camera provided with a cartridge chamber within which is charged a film cartridge of a type having a disengageable reversion preventing mechanism and a device for selectively disabling the reversion preventing mechanism of said film cartridge which has been charged within said cartridge chamber, said camera comprising:
   a. an opening formed at one portion of said cartridge chamber for charging or removing said cartridge thereinto or therefrom through said opening:
   b. a cover for selectively shielding the opening of said cartridge chamber;

c. a mounting means forming a part of the peripheral wall surface of said cartridge chamber positioned perpendicular to the opening of said cartridge chamber, said mounting means having at one portion thereof a hole, said hole being located at the position corresponding to the location of said reversion preventing mechanism when said film cartridge has been charged into said cartridge chamber;

d. an elongate pin having a head portion, said portion being selectively engageable with the reversion preventing mechanism of said film cartridge charged within said cartridge chamber so as to disengage said reversion preventing mechanism from said pin, said elongate pin being slidably mounted at one portion thereof within the hole of said mounting means as well as being displaceable between a projecting position wherein the head portion of said pin is protruded into said cartridge chamber through the hole of said mounting means to be engaged with said reversion preventing mechanism so as to disengage said reversion preventing mechanism and a retracting position wherein said head portion is retracted from the interior of said cartridge chamber so as to render said reversion preventing mechanism effective;

e. a first means for resiliently urging said elongate pin toward its projecting position from its retracting position;

f. a second urging means for urging said elongate pin toward the retracting position from said projecting position by imparting an energizing force larger than the energizing force of said first urging means so as to detain said elongate pin forcedly in said retracing position; and g. a release means for overcoming the energizing force of said second urging means so as to permit the displacement of said elongate pin to said projecting position, said release means being actuated by a selective operation from the exterior of said cartridge chamber at the complete termination of a predetermined action for charging or removing said cartridge into or from said cartridge chamber, whereby the operation for charging or removing the film cartridge into or from said cartridge chamber is facilitated.

10. A motion picture camera according to claim 9, in which one part of said release means is mounted near the closed position of said cover and said release means is actuated by the closing motion of said cover.

11. A motion picture camera according to claim 9, in which said release means comprises a release button for controlling the starting action of a camera from the exterior of said camera and is actuated in association with the action of said release button.

12. A motion picture camera according to claim 9, in which said second urging means comprises a rotatable bell-crank member mechanically linked at one end thereof to said elongate pin while at the other end thereof to said release means and a spring engaged with said bell-crank member so as to impart an energizing force to said bell-crank member, said bell-crank member being able to urge said elongate pin toward said retracting position.

13. A motion picture camera according to claim 12, wherein said first urging means comprises a spring engaged with said elongate pin, the resilience of said spring being smaller than the resilience of the spring of said second urging means.

14. A motion picture camera equipped with a cartridge chamber for charging therewithin a film cartridge, said film cartridge composed of a hollow cylindrical-shaped shaft having an opening in the center of said shaft, a film winding-up member rotatable about the shaft and a disengageable reversion preventing mechanism; said reversion preventing mechanism comprising a projection on the film winding-up member and a control member provided within the shaft to be movable along the shaft between a first position wherein the control member is engageable with the projection to prevent rotation of the reversion preventing mechanism in one direction and a second position wherein the control member is disengaged from the projection thereby permitting rotation of the film winding-up member in both directions, and a means for resiliently urging the control member toward its second position from its first position, said camera comprising:

a. an opening formed at one part of said cartridge chamber so as to charge or remove said film cartridge into or from said cartridge chamber through said opening;

b. a cover for selectively shielding the opening of said cartridge chamber;

c. mounting means formed in one part of the peripheral wall surface of said cartridge chamber located in a position perpendicular to the opening of said cartridge chamber, said mounting means having at one portion thereof a hole corresponding to the opening of said shaft when said cartridge is charged into said cartridge chamber;

d. an elongate pin having a head portion, said head portion being selectively engageable with said control member of the film cartridge charged within said cartridge chamber, said elongate pin being slidably mounted at one part thereof within the hole of said mounting means as well as being displaceable between the projecting position wherein said head protion is engaged with said control member by passing through the opening of said shaft so as to move said control member to the second position from the first position and the retracting position wherein said head portion is retreated from said cartridge chamber so as to permit said control member locating on said first position;

e. a first means for resiliently urging said elongate pin toward its projecting position from its retracting position, said first means having a spring having an energizing force larger than the energizing force imparted by the urging means of said film cartridge;

f. a second urging means for urging said elongate pin toward the retracting position from the projecting position with an energizing force larger than the energizing force of said first urging means as well as for detaining said pin forcedly in said retracting position; and g. a release member for overcoming the energizing force of said second urging means and for permitting the displacement of said elongate pin to said projecting position, said release member having one end thereof mechanically linked to said second urging means while the other end thereof comprises a detecting portion for detecting the opened or closed state of said cover, said release member further being displaceable in association with the opening or closing motion of said cover within the range between an operative position wherein said member is protruded beyond the closing position of said cover when it is left open so as to cause the energizing force of said second urging means to be larger than the energizing force of said first urging means and an inoperative position wherein said member is retracted from the closing position of said cover when it is closed so as to cause the energizing force of said second urging means to be smaller than the energizing force of said first urging means.

15. A motion picture camera equipped with a cartridge chamber for charging therewithin a film cartridge, said film cartridge composed of a hollow cylindrical-shaped shaft having an opening in the center of said shaft, a film winding-up member rotatable about the shaft and a disengageable reversion preventing mechanism; said reversion preventing mechanism comprising a projection on the film winding-up member and a control member provided within the shaft to be movable along the shaft between a first position wherein the control member is engageable with the projection to prevent rotation of the reversion preventing mechanism in one direction and a second position wherein the control member is disengaged from the projection thereby permitting rotation of the film winding-up member in both directions, and a means for resiliently urging the control member toward its second position from its first position, said camera further comprising:
   a. an opening formed at one part of said cartridge chamber for charging or removing said film cartridge into or from said cartridge chamber through said opening,
   b. a cover for selectively shielding the opening of said cartridge chamber,
   c. a lock member for closing said cover under lock, said lock member being displaceable between a locking position wherein said cover can be locked and an unlocking position wherein said cover is permitted to be opened,
   d. a mounting means formed in a peripheral wall surface of said cartridge chamber at the position perpendicular to the opening of said cartridge chamber, said mounting means being disposed at one portion thereof at the position corresponding to the opening of said shaft when said cartridge is charged into said cartridge chamber,
   e. an elongate pin having a head portion, said head portion being selectively engaged with the control member of said cartridge charged within said cartridge chamber, said elongate pin being slidably mounted at one portion thereof within a hole of said mounting means as well as being displaceable between the projecting position wherein said head portion is engaged with said control member passing through the opening of said shaft so as to move said control member to the second position from said first position and the retracting position wherein said head portion is retracted from said cartridge chamber so as to permit said control member to be located on said first position,
   f. first means for resiliently urging said elongate pin toward its projecting position from its retracting position, said first means being provided with a spring having an energizing force larger than the energizing force of the urging means of said cartridge,
   g. second urging means for urging said elongate pin toward the retracting position from the projecting position with an energizing force larger than the energizing force of said first urging means and for forcedly detaining said pin in said retracting position, and
   h. a release member for selectively overcoming the energizing force of said second urging means so as to permit the displacement of said elongate pin to said projecting position, said release member being mechanically linked at one end thereof to said second urging means while at the other end thereof to said lock member.

16. A motion picture camera according to claim 15, wherein said second urging means comprises a rotatable bell-crank member mechanically linked at one end thereof to said elongate pin while at the other end thereof to said release member, and a spring engaged with said bell-crank member for imparting an energizing force to said bell-crank member, said bell-crank member being capable for urging said elongate pin toward said retracting position with an imparted energizing force.

17. A motion picture camera employing such a type of a film cartridge as the one provided with a disengageable reversion preventing mechanism, said film cartridge accommodating therewithin a photographic film formed in a sound recording portion at one part thereof as well as restricting the travel of the film in one direction and also being functional in selectively disabling the reversion preventing mechanism of said film cartridge, as well as being capable of recording an image information together with a sound information concurrently on the film contained in said film cartridge, said camera further comprising:
   a. a cartridge chamber within which is charged said film cartridge,
   b. an image forming means for recording the image information on said film,
   c. a sound recording means, said means being arranged to be disposed at least at one side portion of the travel path of said film and having a transducing head member for recording said sound information on the sound recording portion of said film,
   d. film feeding means for running the film at a constant rate when said film is being adapted to pass through a position adjacent to said transducing head member, said film feeding means having a capstan roller and a pinch roller which are arranged to be disposed on opposite sides of the travelling path of said film substantially facing each other, said pinch roller being displaceable between a first position wherein said pinch roller is brought into contact with said capstan roller through the medium of said film whereby said film can be fed with the help of friction caused by the contacting rotational motions of said capstan roller and said pinch roller, and a second position wherein said pinch roller is spaced from said capstan roller so as to release said film interposed between said capstan roller and said pinch roller,
   e. disengaging means for selectively disabling the reversion preventing mechanism of said film cartridge charged within said cartridge chamber, said disengaging means comprising an elongate pin having a head portion selectively engaged with said reversion preventing mechanism, said elongate pin further having a flange for limiting extension of the head portion into the chamber, means mounting thereon said elongate pin for movement between a third position wherein said head portion is effective to disable the reversion preventing mechanism of the charged cartridge and a fourth position wherein said elongate pin is in a retracted position relative to the cartridge chamber and is ineffective to disable the reversion preventing mechanism accordingly, means for urging said elongate pin toward its third position, said urging means having a spring which is engageable with the elongate pin, blocking means for selectively detaining said elongate pin in said fourth position against the energizing force of said urging means; and f. a release member for controlling the displacement of said pinch roller as well as for releasing the action of said blocking means, said release member being selectively displaceable, with the help of an external operation of a camera, between an operative position wherein said pinch roller is moved to said first position to disable said blocking means and to permit the displacement of said elongate pin to said third position and an inoperative position wherein said pinch roller is retained in said second position to make said blocking means effective for the foregoing action so as to retain said elongate pin in said fourth position.

18. A motion picture camera according to claim 17, in which said blocking means comprise a rotatable bell-crank member mechanically linked at one end thereof to said elongate pin while at the other end thereof to said release member, and a spring engaged with said bell-crank member which urges said elongate pin toward said fourth position with the help of an energizing force larger than the resilience of the spring engaged with said urging means adapted to energize said elongate pin toward said third position.

19. A motion picture camera employing a film cartridge accommodating therewithin a photographic film having a sound recording portion at one part thereof for effecting to record an image information together with a sound information concurrently on said film, said film cartridge composed of a hollow cylindrical-shaped shaft having an opening in the center of said shaft, a film winding-up member rotatable about the shaft and a disengageable reversion preventing mechanism; said reversion preventing mechanism comprising a projection on the film winding-up member and a control member provided within the shaft to be movable along the shaft between a first position wherein the control member is engageable with the projection to prevent rotation of the reversion preventing mechanism in one direction and a second position wherein the control member is disengaged from the projection thereby permitting rotation of the film winding-up member in both directions, and a means for resiliently urging the control member toward its second position from its first position, said camera further comprising:

a. a cartridge chamber within which is charged said film cartridge, b. an image forming means for recording said image information on said film, c. a sound recording means, said means being disposed at least at one side part of said film travelling path and having a transducing head member for recording the sound information on the sound recording portion of said film, d. a film feeding means for running the film substantially at a constant rate when said film passes near said transducing head member, said film feeding means having a capstan roller and a pinch roller both of which are disposed on the opposite sides of said film travelling path to be nearly facing each other, said pinch roller being displaceable between a first position wherein said pinch roller is brought into contact with said capstan roller through the medium of said film whereby said film can be fed with the help of friction caused by contacting rotational motions of said capstan roller and said pinch roller, and a second position wherein said pinch roller is spaced from said capstan roller to release said film interposed between said capstan roller and said pinch roller, e. disengaging means for selectively disabling the reversion preventing mechanism of said film cartridge charged within said cartridge chamber, said disengaging means composed of mounting means formed in a peripheral wall surface of said cartridge chamber and having a hole at a position substantially corresponding to the opening of said shaft when said film cartridge is charged into said cartridge chamber;

f. an elongate pin having a head portion, said head portion being selectively engaged with the control member of said film cartridge charged within said cartridge chamber, said elongate pin being displaceable between a projecting position wherein said head portion is engaged, passing through the opening of said shaft, with said control member so as to displace said control member to the second position from said first position, and a retracting position wherein said head portion is retracted from said cartridge chamber so as to permit said control member to be located in said first position, g. first means for resiliently urging said elongate pin toward its projecting position from its retracting position, said means having a spring having an energizing force larger than the energizing force of the urging means of said film cartridge, h. second urging means for energizing said elongate pin toward the retracting position from the projecting position with an energizing force larger than the energizing force of said first urging means so as to retain forcedly said pin in said retracting position; and i. a release member mechanically linked to both said pinch roller and said second urging means as well as actuated by an operation from the exterior of a camera, said release member being displaceable between a first position wherein said pinch roller is retained in said first position and the energizing force of said second urging means is weaker than the energizing force of said first urging means so as to displace said elongate pin to said projecting position and a second position wherein said pinch roller is retained in said second position and the energizing force of said second urging means is larger than the energizing force of said first urging means.

20. A motion picture camera according to claim 19, wherein said second urging means comprises a rotatable bell-crank member mechanically linked at one end thereof to said elongate pin while at the other end thereof to said release member and a spring engaged with said bell-crank member for imparting to said bell-crank member an energizing force, whereby said bell-crank member is adapted to urge said elongate pin toward said retracting position.

21. A motion picture camera provided with a cartridge chamber into which is charged a film cartridge of a type having a disengageable reversion preventing mechanism and a device for selectively disabling the reversion preventing mechanism of said film cartridge charged within said cartridge chamber, said camera comprising:
   a. an elongate pin having a head portion, said head portion being selectively engaged with the reversion preventing mechanism of said film cartridge charged within said cartridge chamber,
   b. means mounting thereon said elongate pin for movement between a first position wherein said head portion is effective to disable the reversion preventing mechanism of the charged film cartridge and a second position wherein said elongate pin is in a retracted position relative to the cartridge chamber to be ineffective to disable the reversion preventing mechanism,
   c. first means for resiliently urging said elongate pin toward its first position from its second position,
   d. second urging means for urging said elongate pin toward the second position from the first position with an energizing force larger than the energizing force of said first urging means so as to retain forcedly said pin in said second position,
   e. a detecting member for detecting the operation of charging or removing said film cartridge into or from said cartridge chamber as well as for controlling said second urging means, said detecting member being mechanically linked at one end thereof to said second urging means while at the other end thereof having a detecting portion to detect the operation for
      charging or removing said film cartridge into or from said cartridge chamber, said detecting member being able to move to a first position wherein said detecting portion is protruded into said cartridge chamber when said film cartridge is not charged within said cartridge chamber whereby the energizing force of said second urging means becomes much stronger than the energizing force of said first urging means, and to a second position wherein said detecting portion is retracted from said cartridge chamber with the help of an actuating power of the operation for charging or removing said cartridge into or from said cartridge chamber, thereby the energizing force of said second urging means is weaker than the energizing force of said first urging means so as to move said elongate pin to said first position.

22. A motion picture camera according to claim 21, wherein said second urging means comprises a rotatable bell-crank member mechanically linked at one end thereof to said elongate pin while at the other end thereof to said releade member, and a spring engaged with said bell-crank member for imparting an energizing force to said bell-crank member, whereby said bell-crank member is able to urge said elongate pin toward said retracting position.

23. A motion picture camera equipped with a cartridge chamber for charging therewithin a film cartridge, said film cartridge composed of a hollow cylindrical-shaped shaft having an opening in the center of said shaft, a film winding-up member rotatable about the shaft and a disengageable reversion preventing mechanism; said reversion preventing mechanism comprising a projection on the film winding-up member and a control member provided within the shaft to be movable along the shaft between the first position wherein the control member is engageable with the projection to prevent rotation of the reversion preventing mechanism in one direction and a second position wherein the control member is disengaged from the projection thereby permitting rotation of the film winding-up member in both directions, and a means for resiliently urging the control member toward its second position from its first position; said camera further comprising:
   a. mounting means formed in a peripheral wall surface of said cartridge chamber and having a hole at a position substantially corresponding to the opening of said shaft when said film cartridge is charged into said cartridge chamber,
   b. an elongate pin having a head portion, said head portion being selectively engaged with the control member of said film cartridge charged within said cartridge chamber, said pin being slidably mounted at one part thereof within the penetrated hole of said mounting means and being displaceable between a projecting position wherein said head portion is engaged, passing through the opening of said shaft, with said control member to move said control member toward the second position from said first position, and a retracting position wherein said head portion is retracted from said cartridge chamber so as to permit the control member to be retained in said first position,
   c. first means for resiliently urging said elongate pin toward its projecting position from its retracting position, said means having a spring having an energizing force larger than the energizing force of the urging means of said film cartridge,
   d. second urging means for urging said elongate pin toward the retracting position from the projecting position with an energizing force larger than the energizing force of said first urging means so as to retain forcedly said pin in said retracting position; and
   e. a detecting member for detecting the operation of charging or removing said film cartridge into or from said cartridge chamber and for controlling said second urging means, said detecting member being mechanically linked at one end thereof to said second urging means while at the other end thereof having a detecting portion to detect the operation of charging or removing said film cartridge into or from said cartridge chamber, said detecting member being able to move to a first position wherein said detecting portion is protruded into said cartridge chamber when said film cartridge is not charged within said cartridge chamber whereby the energizing force of said second urging means becomes much stronger than the energizing force of said first urging means, and to a second position wherein said detecting portion is retracted from said cartridge chamber with the help of an actuating power of the operation for charging or removing said film cartridge into or from said cartridge chamber whereby the energizing force of said second urging means is weaker than the energizing force of said first urging means so as to move said elongate pin to said first position.

* * * * *